US006944759B1

(12) United States Patent
Crisan

(10) Patent No.: US 6,944,759 B1
(45) Date of Patent: Sep. 13, 2005

(54) AUTOMATIC SYSTEM CONFIGURATION MANAGEMENT

(75) Inventor: Adrian Crisan, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 09/675,532

(22) Filed: Sep. 29, 2000

(51) Int. Cl.[7] .............................. G06F 1/24; G06F 9/00
(52) U.S. Cl. ........................... 713/100; 713/1; 714/25; 702/123; 702/182
(58) Field of Search ................................ 713/1, 2, 100; 709/200, 220, 221; 710/104; 714/47, 46, 714/25; 717/151, 152, 153, 154; 702/123, 702/182; 324/512

(56) References Cited

U.S. PATENT DOCUMENTS

| | | | | |
|---|---|---|---|---|
| 4,815,076 A | * | 3/1989 | Denney et al. ............... | 714/26 |
| 5,161,158 A | * | 11/1992 | Chakravarty et al. ......... | 714/26 |
| 5,664,093 A | * | 9/1997 | Barnett et al. ................ | 714/31 |
| 5,835,886 A | * | 11/1998 | Scheil ......................... | 702/179 |
| 5,950,011 A | * | 9/1999 | Albrecht et al. ............. | 717/167 |
| 6,059,842 A | * | 5/2000 | Dumarot et al. ............. | 717/153 |
| 6,484,128 B1 | * | 11/2002 | Sekiya et al. ................ | 702/185 |

FOREIGN PATENT DOCUMENTS

JP      03260872 A   * 11/1991   ........... G06F 15/60

OTHER PUBLICATIONS

IBM Technical Disclosure Bulletin—"Algorithm for Determining Optimum Configurations of Memory Hierarchies"—Dec. 1, 1972—vol. 15, Issue 7, pp. 2330-2333.*

IBM Technical Disclosure Bulletin—"Hardware Functional Compatibility Test Methodology"—Nov. 1, 1989—vol. 32, Issue 6B, pp. 467-469.*

* cited by examiner

*Primary Examiner*—Thuan Du

(57) ABSTRACT

An automatic configuration system automatically analyzes a user's computer system configuration and recommends a more optimal configuration of components. The system determines the hardware and software components currently contained in the user's computer including versions of hardware and software components. The system uses a knowledge base of previously identified problems to determine an overall problem index value for the user's particular configuration. Generally, the overall problem index value is generally indicative of the quantity and/or severity of the problems associated with the user's computer. The automatic configuration system then varies the configuration (e.g., the versions of software) and determines a new overall problem index value for each variation. The system selects the configuration with the lowest overall problem index value, which generally will have the fewest and/or less severe problems and recommends that configuration to the user.

24 Claims, 3 Drawing Sheets

AUTOMATIC SYSTEM CONFIGURATION MANAGEMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to configuring a computer system with software to improve the performance of the computer. More particularly, the invention relates to a technique for automatically managing the configuration of a computer system.

2. Background of the Invention

One persistent area of concern for users of computers is operational defects in the computer system to improve the performance of the computer. Operational defects in the context of this disclosure include software "bugs" and different software applications that, although operationally sound by themselves, experience problems when run in concert with other software applications. Further, some software programs do not work well with certain hardware components (e.g., scanners, network interface cards). Such problems can cause a system to perform at less than an optimal level and even "crash" in certain situations. Often, the source of the particular problems is not immediately apparent to the user.

There are several techniques for addressing such problems. For instance, by tracking such problems, improvements can be made to software applications that cause a problem. Thus, as a software supplier develops a new version of its software, not only may new and improved featured be added, but corrections for bugs previously detected can be implemented as well. Further, developers of computer suppliers, operating systems, and software applications can make software "patches" available to the public, such as through their websites. Users can download a patch to correct a problem. Sometimes, multiple patches must be downloaded to correct a multitude of problems.

At least some problems a particular computer system experiences can be resolved by loading a different version of certain software applications. Typically, most computers users attempt to determine their optimum software configuration for their system through trial and error by loading and testing different versions of software. As such, different versions of software are tried until the user happens upon a particular software configuration that makes the entire system seem to perform the best. Even then, the user's computer still may not have the most optimal software load. Accordingly, it would be desirable to have a better way to make a computer system perform better.

BRIEF SUMMARY OF THE INVENTION

The problems noted above are solved in large part by an automatic configuration system that automatically analyzes a user's computer system configuration and recommends a more optimal configuration of components. The system determines the hardware and software components currently contained in the user's computer including versions of hardware and software components. The system uses a knowledge base of previously identified problems to determine an overall problem index value for the user's particular configuration. Generally, the overall problem index value is indicative of the quantity and/or severity of the problems associated with the user's computer caused by the software and hardware components individually or in connection with one another. The automatic configuration system then varies the configuration (e.g., the versions of software) and determines a new overall problem index value for each variation. The system selects the configuration with the lowest overall problem index value, which generally will have the fewest and/or less severe problems and recommends that configuration to the user.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
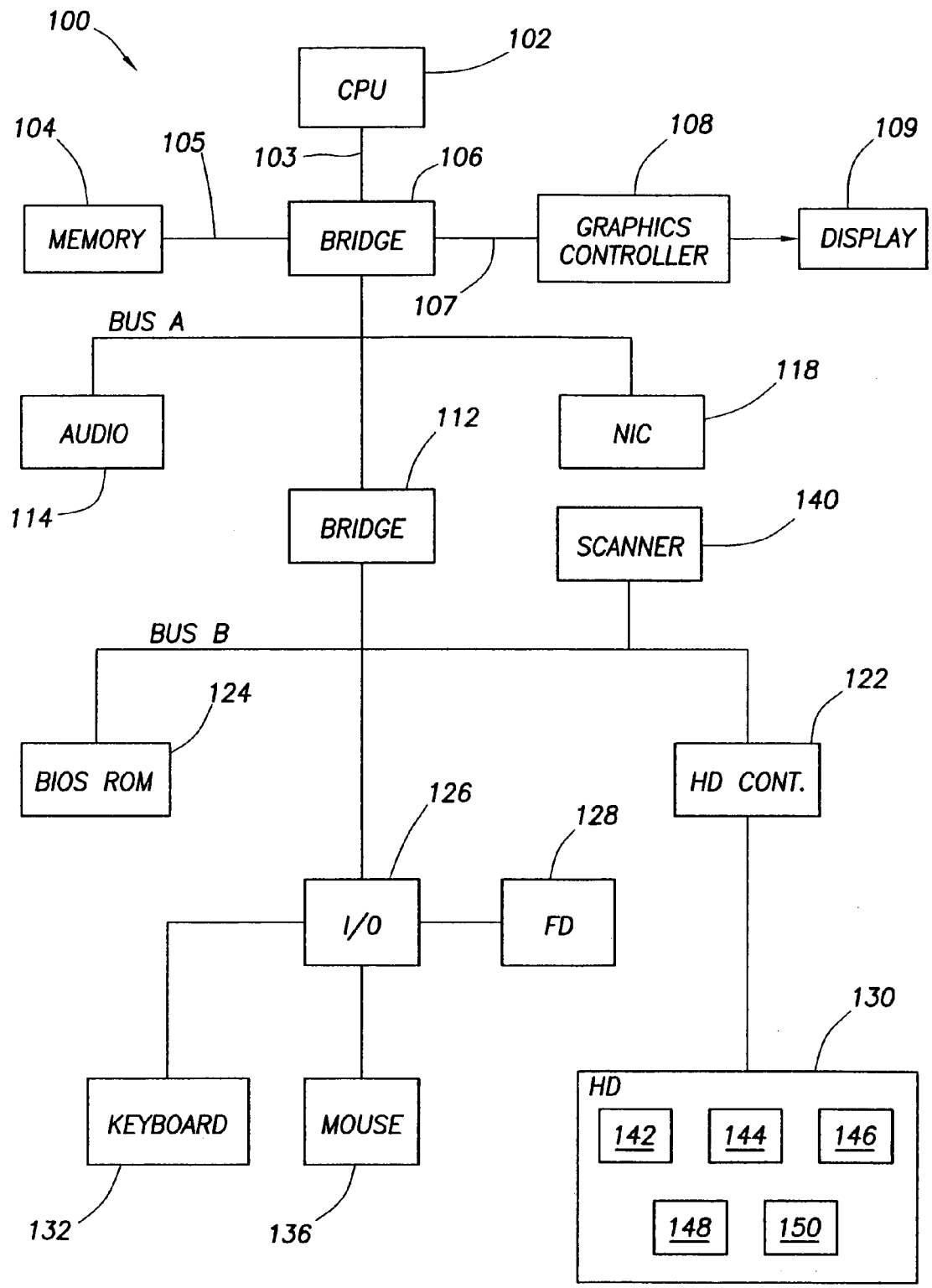
FIG. 1 shows a block diagram of a computer system constructed in accordance with the preferred embodiment.

Referring now to FIG. 1, illustrates an exemplary architecture of a computer system 100. Although the system 100 can be implemented with many other architectures, the embodiment shown in FIG. 1 is presented to aid in explaining the operation of a preferred embodiment of the invention. Computer system 100 includes a CPU 102 coupled to a bridge logic device 106 via a CPU bus 103. The bridge 106 also couples to a main memory array 104 by a memory bus 105, and may further couple to a graphics controller 108 and display 109 via an accelerated graphics port ("AGP") 107. The bridge 106 couples CPU 102, memory 104, and graphics controller 108 to other peripheral devices in the system through a primary expansion bus ("BUS A") which may be implemented as a peripheral component interconnect ("PCI") bus or an extended industry standard architecture ("EISA") bus or any other desired bus. Various components that comply with the communications protocol and electrical requirements of BUS A may reside on this bus, such as an audio device 114 and a network interface card ("NIC") 118.

If other secondary expansion buses are provided in the computer system, as is typically the case, another bridge logic device 112 is used to couple the primary expansion bus, BUS A, to a secondary expansion bus ("BUS B"). Various components that comply with the bus protocol of BUS B may reside on this bus, such as hard disk controller 122 which couples to a hard drive 130, a basic input/output system read only memory ("BIOS ROM") 124, an I/O controller 126, and a scanner 140. BIOS ROM 124 stores the system BIOS firmware that is executed by CPU 102 during system initialization. The I/O controller 126 typically interfaces to input/output devices such as a keyboard 136, a mouse 132, a floppy disk drive 128, and various other input and output devices as desired.

Referring still to FIG. 1, hard drive 130 is shown with various software applications 142, 144, 146, 148, and 150 loaded onto it. Such applications may include anything the user desires such as a word processing program, a spread sheet program, accounting software, graphics drivers, printer drivers, and the like. One or more of these software applications or drivers may be available in different versions from the suppliers. Further, each of the hardware components shown may be available from different suppliers and different versions of the component from the same supplier. For example, the scanner 140 may be available in 4 or 5 different models from one supplier and 3 different models from another supplier. Further, various companies may supply suitable versions of graphics controllers 108. As noted above, various problems may occur as a result of interactions between particular versions of hardware components or software applications. In this disclosure, unless otherwise indicated, the term "component" includes both hardware devices and software.

In accordance with the preferred embodiment of the invention, a user's computer system is analyzed and, if the system can be made better (i.e., perform better, experience fewer or less severe problems), one or more software version changes are recommended. This process preferably occurs automatically, thereby making it easier and quicker for a user to improve the performance of the computer system.

Figures 2, 3:
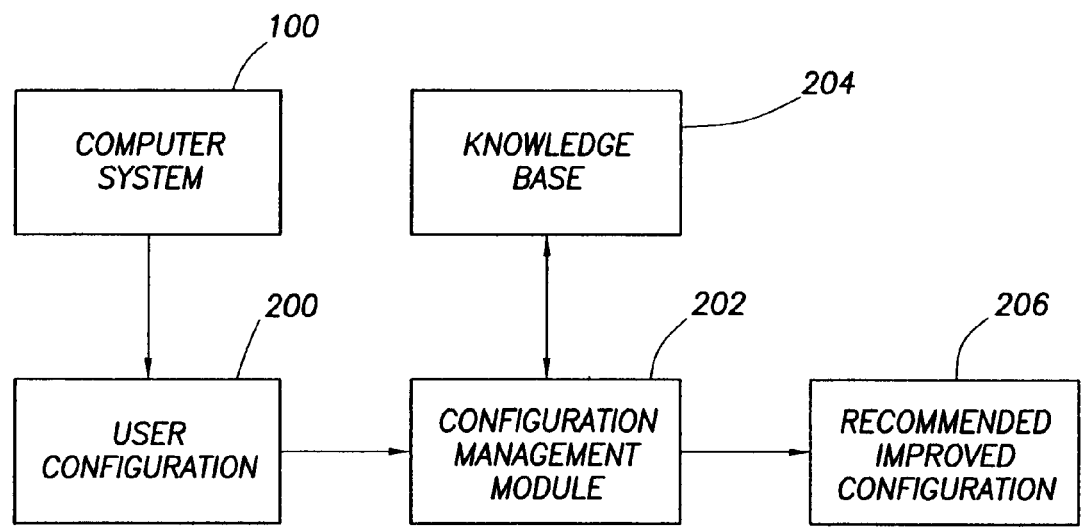
FIG. 2 shows a configuration management module and a knowledge base used to automatically determine an optimal configuration for a given computer system.
FIG. 3 shows more detail of the knowledge base of FIG. 2.

Referring now to FIG. 2, the preferred embodiment of the automatic configuration analysis and improvement mechanism includes a configuration management module 202 which interacts with a knowledge base 204. The configuration management module 202 generally analyzes a computer system's current configuration of hardware and software components 200 using the knowledge base 204 and recommends an improved configuration 206 to the user. The recommended configuration 206 may include such recommendations as different versions of the software the user already uses or new software altogether that the user should use. The recommended configuration generally will be one that will improve the performance of the computer system. Improved performance includes operating faster, experiencing fewer problems, and/or experiencing less severe problems such as system lock-ups and crashes.

Referring now to FIG. 3, the knowledge base 204 includes knowledge of hardware and software problems that have been previously determined to exist. Such problems are commonly recorded by computer companies. Many of these problems are caused by software applications provided by various third party software companies. Each entry in the knowledge base 204 preferably pertains to a particular hardware or software component or interaction 208 between hardware and/or software components. For each such interaction 208, a problem index 210 is determined, computed, or otherwise assigned to the combination of components. In addition, a comment field 212 is included in which free hand text can be entered describing the problem.

In general, the problem index 210 is a relative measure of the problems associated with the particular components. The index preferably takes into account (1) the number of problems that result from the interaction and (2) the severity of each problem. An interaction of components that results in a large number of problems preferably would have a higher relative problem index 210 than an interaction of different components with fewer problems. Further, problems that cause the entire computer system to crash are generally recognized as the most severe types of problem, while problems that merely cause an error with the way data is formatted are generally considered less severe. All else being equal, a system with more severe component interactions than another system would have a higher problem index. Accordingly, the problem index takes into account both the quantity of problems and their severity.

One of ordinary skill in the art will appreciate that there are many different ways to take these criteria into account and in assigning problem indices to hardware and software component interactions. For example, the index could be on a scale of 1 to 5 with 1 indicating few and minor problems, if any, and 5 indicating many and/or severe problems. Further, there generally are various categories of interactions between two hardware or software components. For example, two software applications may have problems associated their graphical representations on the display, communications problems, etc. Each category could be assigned a problem index and then the individual problem indices could be summed together to formulate an overall problem index 210.

In accordance with the preferred embodiment of the invention, a problem index 210 is assigned for each interaction of components discussed above. It should be noted that problems can exist with individual software or hardware components that do not result from that component interacting with other components. Such a problem, e.g., the scanner entry in FIG. 3, would still be entered into the knowledge base 204 and assigned a problem index 210. In FIG. 3, for example, software A, version 1 ("SWA V.1") and software B, version 1 ("SWB V.1") have a problem index of 11 while the scanner by itself has a problem index of 25.

Figure 4:
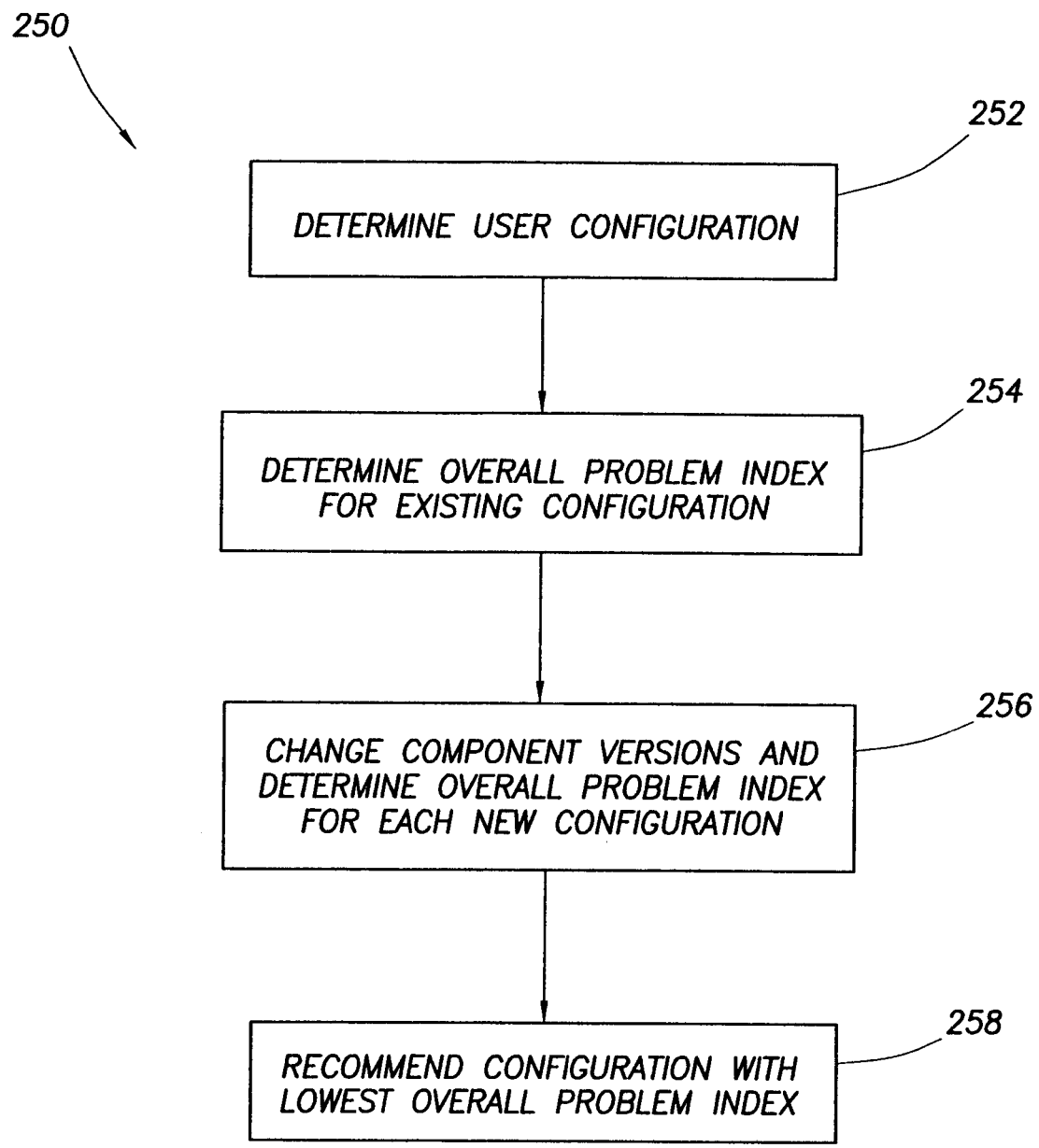
FIG. 4 shows the actions performed by the configuration management module of FIG. 2.

Referring now to FIGS. 3 and 4, the configuration management module 202 preferably performs method 202 which includes steps 252, 254, 256, and 258 (although step 252 may not be performed by the configuration management module). In 252, the configuration of the user's computer system 100 is determined. This step preferably is performed using any suitable software application known to those of ordinary skill in the art that can determine and report the complete configuration of a computer system. Most computers keep such information in a flash ROM (e.g., ROM 124 in FIG. 1) or a file on a hard disk drive. The configuration information preferably includes all of the various software applications 142–150 loaded onto the computer's hard drive 130, and hardware components such as NIC 118, scanner 140, audio 114, and other devices. For each such software or hardware component, a version indicator is also included if any such indicator is available. For example, a software application XYZ may be available from the vendor in two versions, version 1.0 and 2.0. The configuration information collected in step 252 includes such version information. The software configuration information preferably also includes the operating system and various device drivers used in the user's system. Further, hardware components may be available in various models. The scanner 140 may be available in various models from each potential supplier.

In step 254, the configuration management module 202 then uses the user's particular list of hardware and software components to determine an overall problem index value for that particular system. This can be done in any one of a variety of ways. For example, the configuration management module 202 may scan through the knowledge base and select problem indices corresponding to hardware or software components or pairs of components that exist in the user's configuration and then add together the selected problem indices to determine the overall problem index.

In step 256, the configuration management module 202 determines whether a better (i.e., more problem free) configuration is possible. The configuration management module 202 accomplishes this preferably by changing the version of the components in the user's configuration determined in step 252 and recalculating the problem index value and determining whether a configuration exists having a lower overall problem index value. In accordance with the preferred embodiment of the invention, the configuration management module 202 preferably does not vary the version of the hardware components because the user likely does not want to change the hardware. Further, the configuration management module 202 varies the configuration by keeping all of the software that the user's computer includes. The configuration management module 202 varies the versions of the software and recomputes the problem index for each such variation. For example, software application XYZ, version 1.0, may be changed to version 2.0 to determine if that change would result in a lower problem index.

There may be more than one configuration of components that have a lower overall problem index than the user's current configuration. The configuration having the lowest problem index, however, is preferable over the other configurations and thus, in step 258, the configuration management module 202 recommends the optimal configuration to the user. This recommendation may take any one of a variety of suitable forms. For example, the recommendation may be a list of instructions as to how the user should vary the software components in his or her computer to lower the problem index. The recommendation might also include downloading certain software programs and patches off a particular website. The user can print out the recommendations and upgrade the computer at a later time. Alternatively, as noted above, some of the recommended upgrades may be simply downloading patches or new software versions off the Internet or ordering new software versions from a software vendors website. Accordingly, the user may be prompted to accept the recommendation and have the system begin the upgrade automatically and immediately. If the user selects the automatic upgrade feature, the configuration management module 202 will download the software in the recommendation and/or facilitate the user ordering new versions of software from the supplier's website.

The configuration management module 202 and knowledge base 204 can exist on any suitable computer system. In accordance with the preferred embodiment of the invention, the configuration management module 202 and knowledge base 204 preferably are accessible on a website on the Internet. As such, the knowledge base 204 can easily be maintained by an entity (e.g., computer manufacturer) that tracks problems reported by its customers and software and hardware vendors. Alternatively, the configuration management module 202 and knowledge base 204 may not be accessible directly by individual computer users. Instead, a user may run the software that determines and reports his or her configuration. That configuration information can be collected into a file which is sent (e.g., email) to the entity that maintains and operates the configuration management module 202 and knowledge base 204. That entity can determine a more optimal configuration for the user and send back to the user the recommendation.

As described above, the preferred embodiment of the invention permits a user's computer to be automatically evaluated and analyzed to determine if a more optimal set of software components is available. This alleviates the user from having to try different components until a configuration is found that seems to work better. The solution is faster and much easier on the user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of improving a configuration of a computer system, comprising:
   (a) determining a current configuration of the computer system, said configuration including hardware and software component information, the information including version information;
   (b) determining an overall problem index value associated with the current configuration, said overall problem index value providing a relative indication of the problems in the computer system;
   (c) varying the configuration of the computer system; and
   (d) determining an overall problem index value for the configuration as varied in (c).

2. The method of claim 1 further including:
   (e) repeating (c) and (d) and selecting the configuration that has the lowest overall problem index value.

3. The method of claim 2 further including recommending that a user reconfigure the system to match the configuration selected in (e).

4. The method of claim 3 wherein (c) includes varying the version of each software application in the configuration determined in (a).

5. The method of claim 1 wherein (c) includes varying the version of each software application in the configuration determined in (a).

6. The method of claim 5 wherein (c) does not include varying the version of the hardware components.

7. The method of claim 1 wherein (b) and (d) includes selecting individual problem index values from a knowledge base.

8. The method of claim 7 further including adding together said individual problem index values to determine said overall problem index value for the configuration.

9. The method of claim 1 wherein said overall problem index value is an indication of the number of problems associated with said configuration.

10. The method of claim 1 wherein said overall problem index value is an indication of the severity of problems associated with said configuration.

11. The method of claim 1 wherein said overall problem index value is an indication of the number of problems and the severity of the problems associated with said configuration.

12. A computer system, comprising:
a configuration management module;
a knowledge base that interacts with said configuration management module; and
said configuration management module receives a current configuration of the computer system, determines an overall problem index value associated with the current configuration, and determines a configuration that has fewer problems than the current configuration.

13. The computer system of claim 12 wherein the configuration management module further varies the configuration of the computer system to produce a new configuration and determines an overall problem index value for the new configuration.

14. The computer system of claim 13 wherein said configuration management module selects the configuration that has the lowest overall problem index value.

15. The computer system of claim 14 wherein said configuration management module recommends that a user reconfigure the system to match the configuration selected as having the lowest overall problem index value.

16. The computer system of claim 15 wherein the configuration includes software and wherein said configuration management module varies the version of each software application in the configuration.

17. The computer system of claim 13 wherein the configuration includes software and wherein said configuration management module varies the version of each software application in the configuration.

18. The computer system of claim 17 wherein said configuration management module varies does not vary the version of the hardware components.

19. The computer system of claim 12 wherein said configuration management module determines the overall problem index value by selecting individual problem index values from a knowledge base.

20. The computer system of claim 19 wherein said configuration management module adds together said individual problem index values to determine said overall problem index value for the configuration.

21. The computer system of claim 13 wherein said overall problem index value is an indication of the number of problems associated with said configuration.

22. The computer system of claim 12 wherein said overall problem index value is an indication of the severity of problems associated with said configuration.

23. The computer system of claim 12 wherein said overall problem index value is an indication of the number of problems and the severity of the problems associated with said configuration.

24. The computer system of claim 12 wherein said knowledge base includes a collection of problems that have been identified for various hardware or software components.

* * * * *